United States Patent [19]

Jackson

[11] Patent Number: 4,857,182

[45] Date of Patent: Aug. 15, 1989

[54] PROTECTION DEVICES FOR BAR SCREENS

[75] Inventor: Jerry E. Jackson, Mechanicsville, Va.

[73] Assignee: Infilico Degremont Inc., Richmond, Va.

[21] Appl. No.: 168,940

[22] Filed: Mar. 16, 1988

[51] Int. Cl.$^4$ .................... B01D 35/02; B01D 35/16; E02B 5/08

[52] U.S. Cl. .................... 270/104; 210/106; 210/121; 210/138; 210/159

[58] Field of Search ................ 210/744, 86, 104, 106, 210/107, 121, 138, 143, 159, 162, 413

[56] References Cited

U.S. PATENT DOCUMENTS

| | | | |
|---|---|---|---|
| 2,092,623 | 9/1937 | Kuster | 210/106 |
| 2,379,615 | 7/1945 | Walker | 210/106 |
| 3,591,006 | 7/1971 | Daferner et al. | 210/159 |
| 4,561,975 | 12/1985 | Schloss, Jr. | 210/159 |

FOREIGN PATENT DOCUMENTS

| | | | |
|---|---|---|---|
| 2443935 | 4/1976 | Fed. Rep. of Germany | 210/159 |
| 2460138 | 6/1976 | Fed. Rep. of Germany | 210/159 |
| 5578708 | 6/1980 | Japan | 210/159 |
| 5622809 | 3/1981 | Japan | 210/159 |
| 151714 | 9/1982 | Japan | 210/159 |

OTHER PUBLICATIONS

Infilco Degremont Inc., "Climber Screen ® Mechanically Cleaned Bar Screen", Sep. 1986.

Infilco Degremont Inc., "Climber Screen (Standard Type)", p 803-1, Jun. 1983.

Tom M. Pankratz, "Screening Equipment Handbook", Technomic Publishing Co., Inc., 1986, pp. 114-119, 128-135.

Primary Examiner—W. Gary Jones
Assistant Examiner—L. Sue Evans
Attorney, Agent, or Firm—Carroll F. Palmer

[57] ABSTRACT

Bar screen apparatus of the type having a motorized rake assembly, that mounts an electric drive motor with associated electrical components which moves the assembly along a guide frame in a closed, approximately vertical path from an upper parking position to and through a lower reversing direction position, is imporved by adding a protection device to prevent the drive motor and associated electrical components from being submerged in a stream of sewage passing the apparatus at an abnormally high level. Such protection device includes a detector unit to sense the presence of liquid that may exist at or above a predetermined level, a monitor unit for determining where the motorized rake assembly is along its travel path during operation of the apparatus, and a logic unit for determining by input from the monitor unit whether the motorized rake assembly should move in a forward direction or in a reverse direction along its travel path from a given location to return with the least amount of travel from the given location. In preferred embodiments, the protection device also addresses overload problems.

8 Claims, 1 Drawing Sheet

PROTECTION DEVICES FOR BAR SCREENS

BACKGROUND OF THE INVENTION

1. Field of the Invention

This invention relates to protective devices for bar screen equipment. More particularly, it concerns devices that prevent motorized carriage assemblies in bar screen equipment from being submerged in sewage being treated by such equipment.

2. Description of the Prior Art

Sewage entering a sewage treatment plant carries with it suspended trash, e.g., rags, pieces of wood, metal cans, bottles, etc. It is necessary to remove this trash before it reaches the mechanical apparatus within the plant to prevent fouling or breakage thereof. This is done by trash removal equipment called "bar screens" which are typically installed in the main sewage inlet channel to the treatment plant. As the trash accumulates on the bar screen, it must be removed in order to maintain the flow of sewage into the plant.

Removal of the trash from the bar screen can be done manually, but most often it is done by some mechanically operated rake assembly. Such rakes move vertically over the bar screen, collecting the trash as they travel upward and transporting it to a discharge point above the top of the sewage inlet channel. Each screen cycle requires bi-directional travel of the rake assembly. Starting from above, the rake assembly first descends into the channel and engages the bar screen, then it ascends out of the channel while it removes the trash from the bar screen and finally returns to an upper position for discharge of the trash into a conveyor, truck or other disposal means.

A variety of rake assemblies have been developed. Some have fixed (non-moving) drive units that utilize chains or cables to raise and lower the rake assembly (see U.S. Pat. No. 4,561,975). Others have motorized assemblies that include the drive motor as part of the traveling rake assembly (see U.S. Pat. No. 3,591,006). By utilizing a horizontal drive shaft and sprockets, such rake assemblies travel up and down a gear or pin rack. The use of such motorized rake assemblies has become the preferred type of equipment for performing the screening process. This is due to desirable operating characteristics and ease of maintenace. The present invention concerns improvements in this type of bar screen equipment which will be referred to hereinafter as motorized rake assemblies.

Depending on the design of the sewage treatment plant and the topography of the area it serves, the main inlet channel may be many feet below ground level. The sewage is first screened at this lower level and then pumped to the main portion of the treatment plan typically installed at or above ground level.

The flow of sewage in treatment plants can vary greatly. Such variation may depend on the time of day and or climatic conditions. At times of high flow, the inlet channel can flood, sometimes fully submerging the bar screen. With some events, e.g., a deluge rainstorm, the rise of water in the channel can occur with great rapidity.

When the channels flood, the rake assemblies can become submerged. Should this occur, electric motors and/or other electrical components on motorized rake assemblies may be compromised since it is not practical, and in some cases not possible, to waterproof their motors and other components. Hence, there exists a need for means to reliably prevent the submergence of the motorized rake assemblies during operation of bar screen equipment. The present invention provides protection devices to fill this need.

OBJECTS

A principal object of the invention is the provision of protection devices for motorized rake assemblies in bar screen apparatus.

Further objects include the provision of:

1. Novel devices for use with bar screen equipment to protect the motor and other electrical components on motorized rake assemblies thereof from being submerged in sewage being treated with the equipment.
2. Such devices that additionally protect the motor against damage due to torque overload.
3. Such devices that may be retrofitted to existing bar screen installations.
4. Such devices that are highly reliable in rendering the protection for which they are employed.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of an improvement in bar screen apparatus of the type that has a motorized rake assembly including an electric drive motor with associated electrical components that moves the assembly along a guide frame in a closed, approximately vertical path from an upper parking position to and through a lower reversing direction position.

The improvement is a novel protection device that prevents the drive motor and associated electrical components from being submerged in a stream of sewage passing the apparatus at a predetermined level with respect to such lower position. Additionally, in some embodiments, the protection device prevents the motor from being damaged by overload such as where the rake assembly becomes jammed by heavy accumulated trash.

The protection device comprises (a) detection means, preferably carried by the motorized rake assembly, to detect the presence of liquid that may exist at or above the predetermined level, (b) monitor means for determining the position of the motorized rake assembly along the path during operation of the apparatus, (c) logic means for determining by input from the monitor means whether the motorized rake assembly should move in a forward direction or in a reverse direction along the path from a given location on the path to return with the least amount of travel from the given location to the upper parking position, and (d) control means for stopping the forward movement of the motorized rake assembly along its path when the detection means signals it that liquid is present at or above the predetermined level, restarting it either in a forward direction or a reverse direction depending on instructions received from the logic means and deactivating the drive motor when the motorized rake assembly reaches the upper parking position.

Advantageously, the protection device may additionally include overload detector means to detect the existence of an overload condition on the drive motor and thereupon deactivate the monitor means to render the motorized rake assembly capable only of moving in a reverse direction.

Additionally, the new device may include second detection means for determining when the level of the stream of sewage has receded from the predetermined level. This second means upon the passage of a preselected time period will reactivate the drive motor of the motorized rake assembly parked at the upper parking position.

The apparatus of the invention may further include counter means to permit the reactivation of the drive motor only for a preselected number of times and then lock out operation of the apparatus to protect against an overload problem existing in the apparatus rather than a sewage level problem. This added feature is advantageous for equipment located in an unmanned pumping station.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
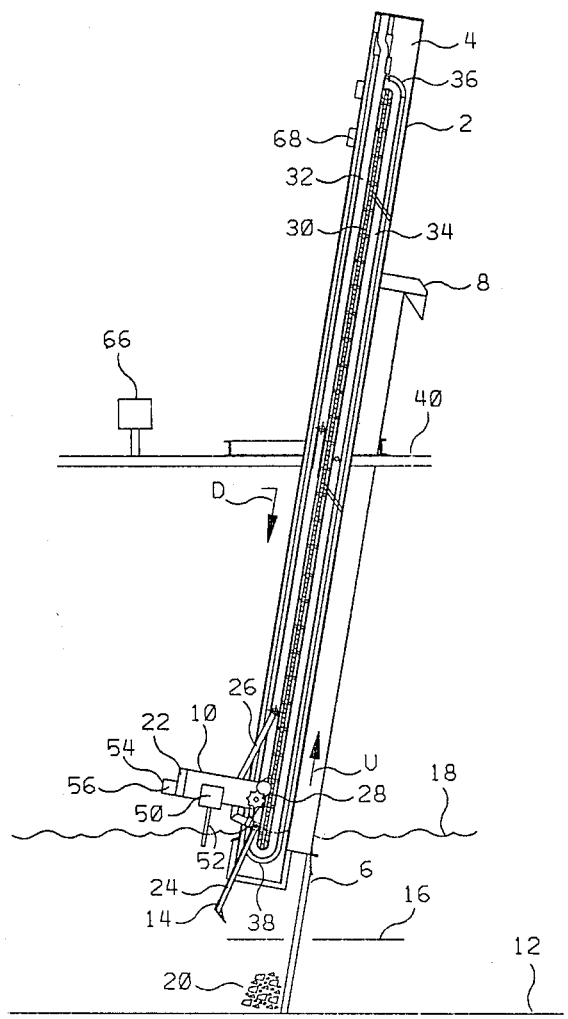
FIG. 1 is lateral view of bar screen apparatus provided with a protection device in accordance with the invention.
Figure 2:
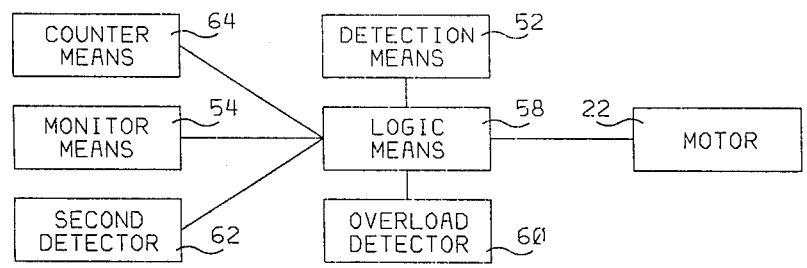
FIG. 2 is a schematic diagram of the interconnection of components a protection device of the invention forming a part of the apparatus of FIG. 1.

Referring in detail to the drawings, in which identical parts are identically marked, bar screen apparatus 2 of the type improved by the invention includes a guide frame 4, a bar screen 6, a discharge chute 8 and a motorized rake assembly 10.

The apparatus 2 is positioned in a channel above the channel floor 12 through which sewage 14 flows at a normal level 16, or an abnormal level 18, causing trash 20 carried by the sewage 14 to collect on the bar screen 6.

The rake assembly 10 includes a drive motor 22, a rake 24, a rollered lever arm 26 and a cog wheel 28 driven by the motor 22.

The guide frame 4 comprises a pin or gear rack 30, a descent guideway 32 and an ascent guideway 34. When the motor 22 is activated, the cog wheel 28 rotates and interacts with the rack 30 to move the rake assembly 10 from an upper parking position 36 on the frame 4 downward in the direction of the arrow D along the path defined by the guideway 32 until the assembly 10 reaches the lower reversing direction position 38. Continued movement of the assembly 10 cause it to the ascend the guideway 34 in the direction of the arrow U until it returns to the upper position 36.

As the assembly 10 descends on the frame 4, the rake 24 is held in a disengagement position as shown in FIG. 1, but as it passes through the position 38, the rake moves into a screen engagement position (not shown) thereby picking up trash 20. When the assembly 10 ascends guideway 34 to the point where the rake 24 reaches the chute 8 positioned above the operation floor 40, the trash will be discharged into the chute 8 for disposal.

Apparatus as described above, which is conventional, is improved by the protection device 50 in accordance with the invention to prevent the drive motor and associated electrical components 10 from being submerged in the stream of sewage 14 passing the apparatus 2 at the predetermined level 18 relative to the lower position 38 of the travel of the rake assembly 10.

The protection device 50 comprises detection means 52 carried by the motorized rake assembly 10 to detect the presence of liquid sewage that exists at or above the predetermined level 18. The detection means may be selected from a variety of liquid sensing devices commercially available, including electronic probes, float switches (see U.S. Pat. No. 3,932,853), limit switches with attached bulb type floats, induction type relays, radio frequency type probes, capacitance type probes, rod type probes or similar electrical, mechanical or electro-mechanical units.

The protection device 50 also comprises monitor means 54 for determining the position of the motorized rake assembly along the path during operation of the apparatus. In the embodiment of FIG. 1, monitor means 54 comprises a double-pole mercury switch 56 fixed to the rake assembly 10. As the assembly 10 descends in the direction D, the switch 56 will be tilted to one side, but when the assembly 10 passes position 38 and ascends in the direction U, switch 56 will tilt to the opposite side. The resulting electric signals from switch 56 therefore signal whether the assembly 10 is in descent between position 36 and 38 or in ascent between these two positions.

A variety of other devices commercially available may be used as the monitor means 54 including a series of photoelectric cells carried on frame 4 for noting the passage at each location of a cell of assembly 10, pressure switches to be engaged by the cog wheel 28, etc. Whatever the particular form of the monitor means 54, it functions to allow the protection device 50 to cause the assembly 10 to return by the shortest path to position 36 once the detector means 50 signals a water level at or above the predetermined safe maximum.

The protection device 50 further comprises logic means 58 that performs several functions, i.e., (a) stops forward movement of rake assembly 10 when detector means signals a water level at or above the predetermined safe maximum, (b) determines by input from the monitor means 54 whether the motorized rake assembly should move in a forward direction or in a reverse direction along the path from a given location on its path of travel to return by the shortest distance from the given location to the upper parking position 36, (c) restarting motor 22 either in a forward direction or a reverse direction depending on instructions received from the logic means and (d) deactivating the drive motor when the motorized rake assembly reacher the upper parking position 36. In preferred embodiments, the logic means will also cause an alarm to sound when needed, e.g., when means 52 is activated.

The logic means 58 may assume a variety of combinations of electrical or electronic hardware, e.g., an integrated electronic circuit board, a combination of electromagnetic or electronic relays and timer switches, etc.

In preferred embodiments of the invention, the device 50 includes one or more of (A) overload detector means 60 to detect the existence of an overload condition on the drive motor and thereupon rendering logic means 58 capable of only allowing the motor 22 to run in a reverse direction, (B) second detection means 62 not carried by the motorized rake assembly 10 for determining when the level of the stream of sewage 14 has receded from the predetermined level 18 and upon the passage of a preselected time period reactivating the drive motor of the motorized rake assembly 10 parked at the upper parking position 36 and/or (C) counter means 64 to permit the reactivation of the drive motor 22 only for a preselected number of times and then lock out operation of the apparatus thereby to protect against an overload problem rather than a sewage level problem.

The second detection means 62 may be mounted in the channel above the floor 12 to determine when the level of the sewage 14 has receded to an acceptable level. When this occurs, the logic means 58 by signal from means 62, after a preselected period of time, automatically returns power to the motor circuit allowing the apparatus 2 to attempt another cycle. If the problem is overload, not sewage level, the counter means 64 will allow a preselected number of restarts before sounding an alarm and locking out the apparatus.

The logic means 58 and related equipment, e.g., master control button, etc., are typically housed in a control station 66 mounted on the operating floor 40 near the apparatus 2.

In operation of apparatus 2 of the invention, the rake assembly 10 will proceed in three different manners I, II and III described below depending on its position when the detection means 52 is activated.

I. With the assembly 10 running in a "forward" direction D down from position 36, the means 52 detects liquid at level 18 as shown in FIG. 1. The motor 22 and assembly 10 stop and an alarm sounds. Then, after a brief time delay, motor 22 restarts in a reverse direction causing the assembly 10 to climb back up the guideway 32 toward the park position 36. As the assembly ascends it passes the reverse limit switch 68 which forms part of the logic means 58 resetting an alternator circuit in means 58. The reset alternator circuit opens the reverse power circuit in logic means 58 whereupon the assembly 10 stops at position 36 and locks out.

The assembly 10 will remain parked at position 36 until an operator is present to observe the level of sewage 14 and take appropriate steps to correct the problem. When this is done, the operator may restart operation of the apparatus 2.

II. With the assembly 10 running in a "forward" direction U past position 38, the means 52 detects liquid at level 18. Such a condition can occur where the sewage 14 makes a sudden surge after the assembly 10 has passed position 38. The motor 22 and assembly 10 continue in operation in the forward direction causing the assembly 10 to climb up the guideway 32 to the park position 36. At this point, the parking limit switch in logic means 58 cuts the power to motor 22 whereupon the assembly 10 stops at position 36 and locks out.

The assembly 10 will remain parked at position 36 until an operator is present to observe the level of sewage 14 and take appropriate steps to correct the problem. When this is done, the operator may restart operation of the apparatus 2.

III. In a preferred embodiment of apparatus 2 with overload detector means 60 with the assembly 10 running in a "forward" direction D down from position 36 and approaching position 38, the rake 24 attempts to engage the bar screen 6, but fails due to an object or mass jammed between it and the bar screen 6. After a short delay time, the motor 22 and assembly 10 stop and an alrm sounds. Then, after a brief time delay, motor 22 restarts in a reverse direction causing the assembly 10 to climb back up the guideway 32 toward the park position 36. As the assembly ascends it passes the reverse limit switch 68 which forms part of the logic means 58 resetting an alternator circuit in means 58. The reset alternator circuit opens the reverse power circuit in logic means 58 whereupon the assembly 10 stops at position 36 and locks out.

During an overload condition, the monitor means 54 is ignored by the logic means 56 since continued operation in the forward direction is prevented by the obstruction making the reverse direction the only choice for travel.

In the following description of operation of a specific embodiment of apparatus 2, relays and other hardware that are unnumbered are not shown in the drawings.

With the rake assembly 10 traveling downward (direction D) in guideway 32, when sewage surface 18 is sensed by detector probe 52, it completes a circuit in a level relay forming part of the detector means 50 causing the contact of the level relay to close. In turn, this completes a circuit through the closed contact of a mercury switch included in monitor means 56 to activate a latch in a triple contact, control relay in the logic means 58.

One of the contacts in that control relay opens to interrupt the power supply to the forward direction coil of the reversing starter of the motor 22, deenergizing the motor 22 and stopping the travel of the assembly 10. A second contact in the relay closes to complete the circuit to an indicating light that signifies, when lit, the movement of the assembly 10 is under control of the logic means 58. A third contact completes a circuit to a time delay relay in the logic means 58, starting its timing period.

One contact of the time delay relay closes at the start of the timing period and opens at its end. This contact activates an annunciator to provide an audible alarm.

Another contact of the time delay relay closes at the end of the timing period completing the circuit to the reverse direction coil of the reversing starter of motor 22 causing the motor to operate in its reverse rotation. The time delay relay serves to insure the motor 22 will be at full stop before it is energized to run in the reverse direction.

When the rake assembly 10 reaches the position 36, a limit switch interrupts the circuit to the coil of the starter of motor 22 thereby stopping travel of assembly 10 at its park position. As the circuits to both the normal and reverse coils of the motor starter are now open, no operation of the motor 22 can take place.

In the event the assembly 10 is moving in direction U via guideway 34 when high water is sensed by the detector means 50, the assembly 10 continues in its travel to the top of frame 4 and stops in the park position 36. In this event, the high sewage level is sensed by the detector means 50 and as described before, the probes 52 complete a circuit to the level relay of the means 50 causing the relay contacts to close. Such closing attempts to complete a circuit to the latch coil of the control relay of logic means 58, but in this case, the contact of the mercury switch in monitor means 56 is open preventing the activation of the latch in the control relay. Hence, the assembly 10 continues on its way. When the assembly 10 reaches the top of the frame 4 and starts travel downward the mercury switch of monitor means 56 closed to energize the latch of the control relay in logic means 58. Thus, the time delay relay begins the same series of events as previously described.

To reactivate the rake assembly 10 after the sewage level has receded from abnormal level 18 to normal level 16, a reset push botton in the control station 66 is depressed to complete the circuit to the control relay delatch coil. When this relay is unlatched, its contacts and dependent units return to the normal operation position. As a safeguard, this reset circuit is locked out by a relay when the sewage level is high and/or when the motor 22 is running in the reverse direction.

If it is desired to have the assembly 10 return to its park position 36 on the occurance of an overload problem, rather than a high sewage level problem, a torque switch takes over the function of the liquid sensor probe 52 in the protection means 50 and operates the logic means 58 in the same manner as the probe 52.

When it is desired to have the assembly 10 return to park position 36 either with a sewage high level problem or an overload problem, a second latch type control relay may be used in the logic means 58. This second type relay is energized and latched by completing a circuit through the torque switch whose contacts act similar to and in parallel with those of the high level control relay, but with one exception. With an overload feature included in the apparatus 2, two indicating lights are used. One signifies the assembly 10 movement is under control of the logic means 58 and was initiated by the detector probe 52. The other light indicates control was initiated by the torque switch.

In a preferred embodiment of the new bar screen apparatus of the invention, the motor 22 is a two speed motor and the logic means 58 is structured to cause such motor to run at its higher speed when the detector means 50 senses liquid while the rake assembly 10 is in ascent in guideway 34.

The embodiments of the invention in which an exclusive property or privelege is claimed are defined as follows:

1. In a reciprocating rake bar screen apparatus comprising a motorized rake assembly including an electric drive motor with associated electrical components that moves said assembly along a guide frame in a closed, approximately vertical path from an upper parking position to and through a lower reversing direction position, the improvement of protection means to prevent said drive motor and associated electrical components from being submerged in a stream of sewage passing said apparatus at a predetermined level relative to said lower position which comprises:
   detection means to detect the presence of liquid that may exist at or above said predetermined level,
   monitor means for determining the position of said motorized rake assembly along said path during operation of said apparatus, and
   logic means for determining by input from said monitor means whether said motorized rake assembly should move in a forward direction or in a reverse direction along said path from a given location on said path to return with the least amount of travel from said given location to said upper parking position and causing said rake assembly to travel either in said forward direction or said reverse direction depending on the input received from said monitor means.

2. The apparatus of claim 1 wherein said detection means comprises a float type switch.

3. The apparatus of claim 1 wherein said detection means comprises an induction type relay.

4. The apparatus of claim 1 wherein said detection means comprises a capacitance type probe.

5. The apparatus of claim 1 wherein said detection means is mounted on said motorized rake assembly.

6. In a reciprocating rake bar screen apparatus comprising a motorized rake assembly including an electric drive motor with associated electrical components that moves said assembly along a guide frame in a closed, approximately vertical path from an upper parking position to and through a lower reversing direction position, the improvement of protection means to prevent said drive motor from being overload and said drive motor plus assiciated electrical components from being submerged in a stream of sewage passing said apparatus at a predetermined level relative to said lower position which comprises:
   detection means carried by said motorized rake assembly to detect the presence of liquid that may exist at or above said predetermined level,
   monitor means for determining the position of said motorized rake assembly along said path during operation of said apparatus,
   logic means for determining by input from said monitor means whether said motorized rake assembly should move in a forward direction or in a reverse direction along said path from a given location on said path to return with the least amount of travel from said given location to said upper parking position, and causing said rake assembly to travel either in said forward direction or said reverse direction depending on the input received from said monitor means, and
   overload detector means to detect the existence of an overload condition in said drive motor and thereupon deactivate said monitor means rendering said motorized rake assembly capable only of moving in said reverse direction.

7. In a reciprocating rake bar screen apparatus comprising a motorized rake assembly including an electric drive motor with associated electrical components that moves said assembly along a guide frame in a closed, approximately vertical path from an upper parking position to and through a lower reversing direction position, the improvement of protection means to prevent said drive motor from being overloaded and said drive motor plus associated electrical components from being submerged in a stream of sewage passing said apparatus at a predetermined level relative to said lower position which comprises:
   first detection means carried by said motorized rake assembly to detect the presence of liquid that may exist at or above said predetermined level,
   monitor means for determining the position of said motorized rake assembly along said path during operation of said apparatus,
   logic means for determining by input from said monitor means whether said motorized rake assembly should move in a forward direction or in a reverse direction along said path from a given location on said path to return with the least amount of travel from said given location to said upper parking position and causing said rake assembly to travel either in said forward direction or said reverse direction depending on the input received from said monitor means, overload detector means to detect the existence of an overload condition in said drive motor and thereupon deactivate said monitor means, and second detection means not carried by said motorized rake assembly for determining when the level of said stream of sewage has receded from said predetermined level and upon the passage of a preselected time period reactivating said drive motor of said motorized rake assembly parked at said upper parking position.

8. The apparatus of claim 7 further including counter means to permit said reactivation of said drive motor only for a preselected number of times and then to lock out operation of said apparatus thereby to protect said drive motor against an overload problem rather than a sewage level problem.

* * * * *